Feb. 2, 1943. I. W. CONRAD 2,309,626
COLOR PHOTOGRAPHY
Filed Aug. 19, 1939

Ivan W. Conrad
INVENTOR.

BY

ATTORNEYS.

Patented Feb. 2, 1943

2,309,626

UNITED STATES PATENT OFFICE 2,309,626

COLOR PHOTOGRAPHY

Ivan W. Conrad, Alexandria, Va.

Application August 19, 1939, Serial No. 291,075

12 Claims. (Cl. 95—2)

The present invention relates to color photography and has for its principal object to provide relatively simple, practical means for the production of color photographs.

Essentially the invention contemplates the use of polarized light in the production of such photographs, utilizing in some instances only the selective action of polarized light in conjunction with colored filters, and in other instances the interference of polarized light to accomplish the desired result. Another object of the invention is the production of color pictures which may readily and at will be caused to produce bizarre or unusual color effects, generally different from the colors originally photographed.

With the foregoing general object in view, the invention consists in the novel combinations and arrangements of features as will be hereinafter more fully described, illustrated in the accompanying drawing, and defined in the appended claims.

In the accompanying drawing wherein are illustrated different, non limiting, practical embodiments of the invention, and wherein like characters of reference denote corresponding parts in related views.

Figure 1:
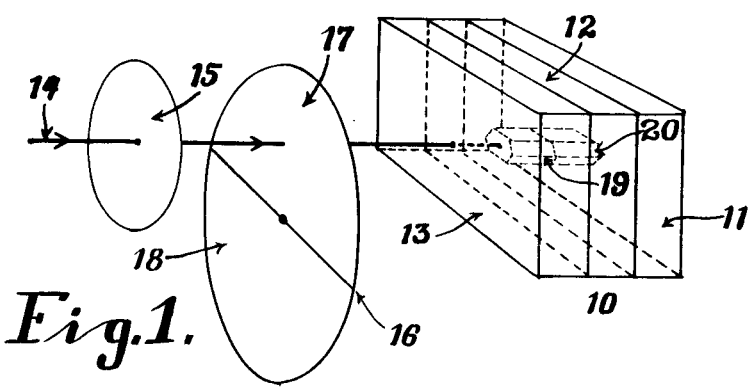
Figure 1 is a diagrammatic view illustrating one practical embodiment of the invention utilizing the selective action of polarized light in conjunction with optical filters and a specially prepared recording medium.

Referring in detail to Fig. 1, there is shown generally at 10 a specially prepared film or medium consisting of a photographically sensitive emulsion 11, an analyzing screen 12, and a base 13. Screen 12 is composed of finely divided polarizing elements 19 with polarizing axes oriented at various angles within the plane of the screen in substantially regularly recurring sets and held in a matrix of such thickness that in general only one polarizing element will be superposed over any given element of emulsion area. Light rays 14 from an object being photographed pass through a polarizing element 15, thence through a color screen 16, onto the specially prepared film 10. Polarizer 15 is suitably mounted for rotation about an axis essentially parallel to light rays 14 and while in any given position or during rotation through an angle $\theta$, the polarized light emergent from polarizer 15 is by a colored filter element 17 of screen 16 made to contain only certain portions of the spectrum. Upon entering screen 12 the selective action of the variously oriented elements thereof operates to expose only those elements 20 of emulsion 11 which are immediately behind elements of analyzing screen having polarizing axes essentially parallel to that of polarizer 15. Such elements of emulsion are thereby correlated with colors transmitted by colored filter 17. Upon rotation of polarizer 15 to a new position, another filter 18, generally different from 17, is brought into the path of light rays 14, thereby operating to expose other and different elements of emulsion 11 to the portions of the spectrum transmitted by the filter 18. Accordingly it will be seen that upon rotation of polarizer 15 through an angle of 180 degrees, all elements of emulsion will have been successively exposed and correlated with one or more colors. Correlation of emulsion elements with colors transmitted by respective filters will be seen to be perfect only when a given position of polarizer 15 permits the transmitted light to act fully upon certain elements of emulsion 11 and not all upon the remaining elements of 11; i. e., when the polarizing elements of screen 12 are some with polarizing axes parallel and the remainder with polarizing axes perpendicular to the polarizing axis of the polarizer 15 at the time exposure through a given filter 17 is made. Such perfect correlation necessarily, therefore, limits the number of filters 17 and 18 to two, one of which will be in path of light during exposure with polarizer 15 in a given orientation, and the other of which will be in path of light when exposure is made with polarizer 15 rotated 90 degrees from said given orientation.

Figure 2:
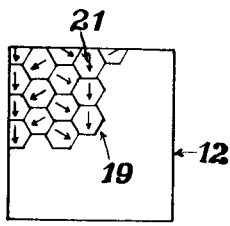
Figure 2 is a diagrammatic view of an analyzing screen suitable for use with 3 color photography.

Larger numbers of filters 17 and 18 may be used with a degree of correlation of color and emulsion element more or less nearly perfect depending upon orientation of analyzer screen elements 19 and number of filters 17 and 18 employed. Fig. 2 for example shows an analyzer screen 12 the elements 19 of which are adapted to the use of three filters; i. e., three color photography. Arrows 21 within the elements 19 indicate the orientation of the respective polarizing axes, it being noted that a differential angle of 60 degrees exists between the three orientations employed. In order to reproduce or make visible the color photograph obtained as indicated above, it will readily be seen that upon "reversing" the image upon emulsion 11, the elemental areas thereof which have been correlated with any given color will be transparent and therefore permit of projection; further, by utilizing for the projection an associated optical system similar to that used in taking the picture, a projected reproduction in color will be obtained. Polarizer 15 and filter 16 may be any of several materials well known to the art. Screen 12 similarly may be built up out of sheet polarizing material elements.

Figure 3:
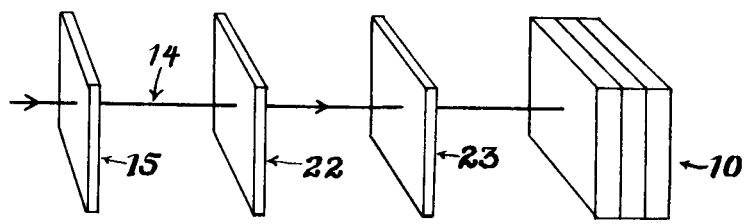
Figure 3 is a diagrammatic view illustrating another practical embodiment of the invention utilizing the rotatory dispersion of polarized light.

In the above described process, the selective action of polarized light has been utilized in conjunction with colored filters to produce the desired result. However, since the function of the rotation of polarizer 15 and filter screen 16 is to supply the film 10 with polarized light in which the plane of polarization varies with color, it will be seen that instead of rotating both 15 and 16, the rotatory dispersive power of optically active materials, such as quartz cut with faces perpendicular to optic axis, may be utilized to obtain a similar result. Referring to Fig. 3, there is shown at 15 a polarizing unit; at 22 a filter screen designed to transmit in general only selected portions of the spectrum; at 23 a rotatory dispersive unit; and at 10 a film similar to that shown in Fig. 1. Because of the action of 23 in rotating the plane of polarization of various colors thru differing angles, it is again possible to correlate color with elemental areas of 10. Projection of the colored photograph is obtained by reversing the image on 10 to obtain a positive, and causing the projected light to traverse an optical system similar to that used in taking the picture. It is of course understood that any other desired method of obtaining rotatory dispersion might be used to produce a similar result.

Figure 4:
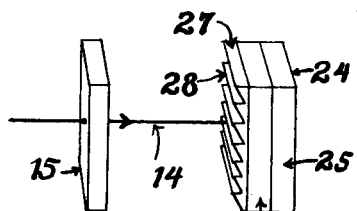
Figure 4 is a diagrammatic view of still another practical embodiment of the invention utilizing the optical interference of polarized light.

Alternatively, the optical interference of polarized light may be used to record and reproduce colored images. Referring to Fig. 4 there is shown at 15 a polarizing unit and at 24 generally a specially constructed film consisting of a reversible emulsion 25, a polarizing unit hereafter referred to as an analyzer 26 which may also serve as a film base, and a birefringent screen 27, the elements 28 of which are of varying thickness. Light rays 14 from the object being photographed are polarized in 15, broken up into two components by 27 and recombined in analyzer 26. Because of the varying thickness of element 28, the various colors of the spectrum will be separated and distributed over the area of the element, the color at any point depending upon the thickness of the birefringent material at that point, the ordinary and extraordinary indices of refraction of the material, and the relative orientation of 15, 27, and 26. Accordingly, color will thereby be correlated with elemental areas of the emulsion 25 and upon reversing the image on 25, a beam of light transmitted by the developed film and associated polarizer will reproduce the colored object photographed.

Bizarre and unusual color effects may be obtained by altering for projection the correlation between color and film element, as for example by rotation of polarizer 15 through an angle from the position occupied during taking of the picture.

Figures 5, 6:
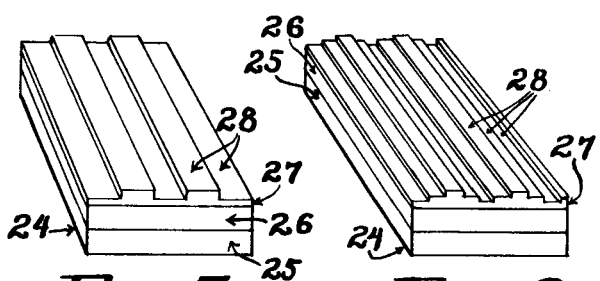
Figures 5 and 6 are diagrammatic views illustrating alternative forms of birefringent screens which may be used in lieu of the birefringent screen shown in Figure 4.

Although the elements of birefringent screen 27 in Fig. 4 are shown continuously variable, it will be apparent that they might vary in discrete steps, the thicknesses utilized being chosen for example to give the effect of two or three color photography as shown in Figs. 5 and 6 respectively, each thickness 28 of screen 27 corresponding to a selected part of the spectrum. Such a screen may be built up by using strips or pieces of Cellophane of appropriate thickness, or alternatively by embossing or engraving a sheet of uniformly thick Cellophane or similar material.

Since the color transmitted at any point is dependent in part upon the ordinary and extraordinary indices of refraction of the birefringent screen 27, it will further be apparent that color separation may be alternatively obtained by using for screen 27 a sheet material es~ lly uniform in thickness but of varying refractive indices from one area element to another. Such a screen may for example be produced by variously straining elemental areas of a Cellophane sheet, the effect of a varying strain in this or similar material being to alter refractive indices accordingly.

Likewise, the third factor influencing color produced by interference of polarized light, namely the relative orientation of polarizer 15, analyzer 26, and birefringent screen 27 may be varied over elemental areas of the specially prepared film 24 to produce the necessary color separation and correlation with film elemental areas.

As in the embodiments shown in Figs. 4, 5, and 6, so in the methods utilizing other variable factors of the birefringent screen to obtain the required color separation, it will be seen that upon "reversing" the photographic image obtained, the elemental area of the emulsion previously exposed to and affected by a given color will now be transparent to a greater or lesser degree depending upon the intensity of said given color in the camera image; and that upon projection, a beam of light transmitted by the "positive" film and associated polarizer will reproduce the colored object originally photographed.

While only certain specific embodiments of the invention have been illustrated and described to convey the general concept of the invention, it is to be understood that the same is readily capable of various other embodiments within its spirit and scope as defined in the appended claims.

I claim:

1. In a color photographic optical system, a photographic element substantially in a focal plane thereof, a polarizing analyzing means adjacent to and in front of said photographic element, a color segregating means in front of said analyzing means, means for polarizing light rays traversing said optical system, at least one of said two means first mentioned being composed of substantially regularly recurring sets of separate finely divided intermingled portions, the portions of the respective sets having different optical effects dependent upon the nature of the polarized light, said color segregating means coacting with both said analyzing means and said polarizing means either to separately group the color components of the polarized rays in a correspondingly regularly recurring manner on a light sensitive photographic element during taking of a picture or to project a photographic picture element so taken and placed in substantially the same position to produce a color picture.

2. A color photographic optical system as set forth in claim 1 in which the color segregating means and the light ray polarizing means are constructed and arranged to coact with each other to polarize in various planes the color components of the light rays.

3. A color photographic optical system as set forth in claim 1 in which the color segregating means comprises a birefringent screen.

4. A color photographic optical system as set forth in claim 1 in which the color segregating means comprises a birefringent screen located between the polarizing means and the analyzing means.

5. A color photographic optical system as set forth in claim 1 in which the color segregating means comprises a birefringent screen having portions of different thickness providing the different optical effects.

6. A color photographic optical system as set forth in claim 1 in which the color segregating means comprises a birefringent screen having portions of different indices of refraction providing the different optical effects.

7. A color photographic optical system as set forth in claim 1 in which the polarizing analyzing means comprises an analyzing screen and the color segregating means comprises a birefringent screen, and in which portions of the birefringent screen and corresponding portions of the analyzing screen are differently oriented relative to each other to provide the different optical effects.

8. A color photographic optical system as set forth in claim 1 in which the polarizing means comprises a polarizing screen and the color segregating means comprises a birefringent screen, and in which portions of the polarizing screen and corresponding portions of the birefringent screen are differently oriented relative to each other to provide the different optical effects.

9. A color photographic optical system as set forth in claim 1 in which the means for polarizing the light rays is rotatable and in which the color segregating means comprises optical filters cooperating with said rotatable polarizing means to polarize in various planes the color components of the light rays.

10. A color photographic optical system as set forth in claim 1 in which the color segregating means comprises a rotatory dispersive element.

11. A color photographic optical system as set forth in claim 1 in which the color segregating means comprises a rotatory dispersive element and a cooperating optical filter.

12. A color photographic optical system as set forth in claim 1 in which at least one of the polarizing means, the color segregating means, and the analyzing means is rotatable to permit variation in color production whereby unusual and bizarre color effects may be obtained.

IVAN W. CONRAD.